Sept. 1, 1942.  W. E. BERG ET AL  2,294,710
COUPLING DEVICE FOR VEHICLES
Filed Nov. 30, 1940  2 Sheets-Sheet 1

INVENTORS
Walter E. Berg
and John C. Elikofer
by Parker, Hochwow & Farmer
ATTORNEYS Sept. 1, 1942.   W. E. BERG ET AL   2,294,710
COUPLING DEVICE FOR VEHICLES
Filed Nov. 30, 1940   2 Sheets-Sheet 2
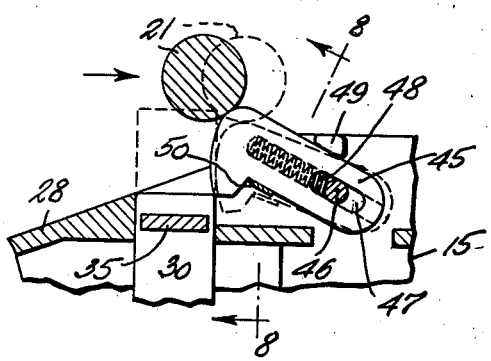
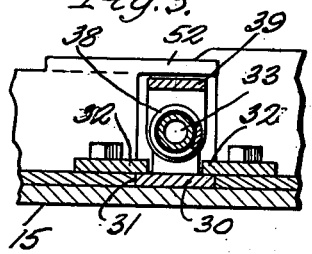
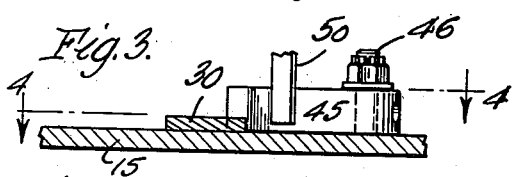
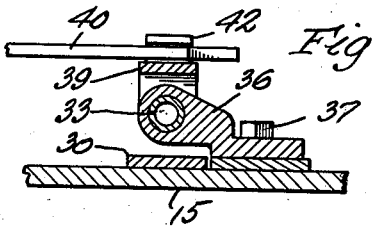
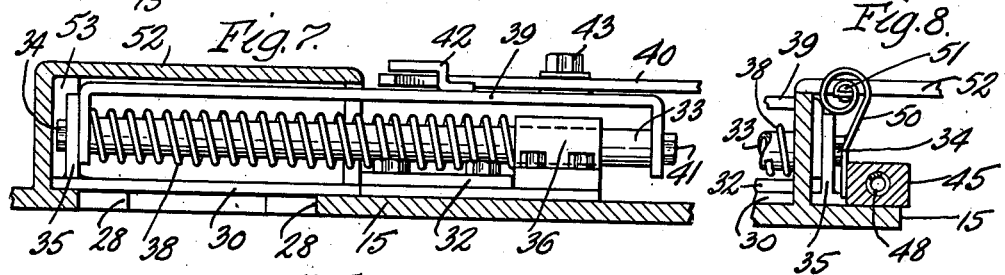
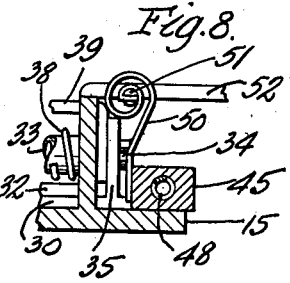
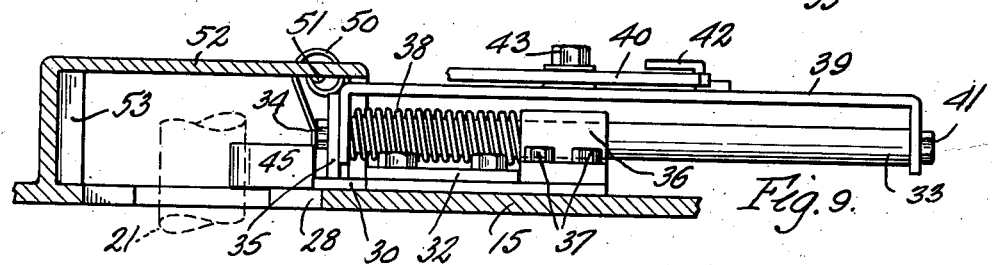
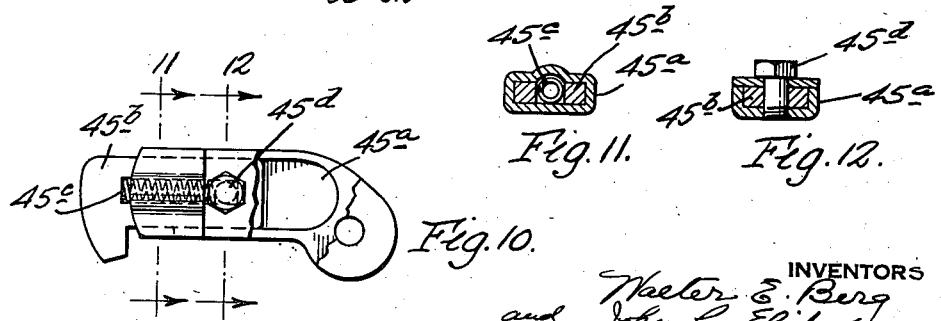
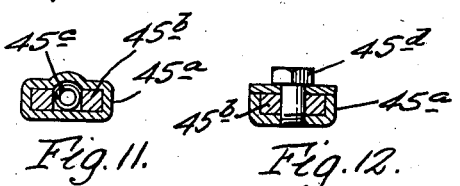
INVENTORS
Walter E. Berg
and John E. Elikofer
by Parker, Rockwood & Farmer
ATTORNEYS Patented Sept. 1, 1942

2,294,710

UNITED STATES PATENT OFFICE 2,294,710

COUPLING DEVICE FOR VEHICLES

Walter E. Berg and John C. Elikofer, Buffalo, N. Y.

Application November 30, 1940, Serial No. 368,020

8 Claims. (Cl. 280—33.1)

This invention relates to improvements in coupling devices for vehicles, more particularly of the fifth wheel coupling type, which are used for coupling trailers to their motor driven tractors. Coupling devices of this type are in use at the present time which comprise an upwardly facing, fifth wheel element or plate on the tractor and a fifth wheel element on the trailer that is arranged to bear on the tractor element and carries a king pin, which, during the act of coupling the tractor to the trailer, is guided into coupling cooperation with coupling means or members on the fifth wheel element of the tractor. These coupling means or members are operated automatically by the movement of the king pin to grasp or engage the latter and couple the tractor and trailer together with the fifth wheel elements in bearing contact, so as to maintain the vehicles in connection with each other while permitting relative swinging or turning movements thereof.

A primary object of this invention is to provide such coupling devices with practical and reliable auxiliary or safety means which will prevent disconnection or separation of the vehicles, with consequent possible damage to the trailer and danger or injury to persons or property, in the event of a breaking or failure for any reason of the coupling device which would release the king pin and, without such safety means, would permit disconnection of the vehicles.

Additional specific objects of the invention are to provide an efficient auxiliary or safety device for the purpose mentioned, which is of simple, but strong construction, and will be a positive insurance against the separation of the vehicles in the event of failure of the primary coupling device; in which the auxiliary or safety device comprises a bolt or member which in operative position, extends across the king pin guideway in the fifth wheel element, back of the king pin and is rigidly held against displacement by abutments or parts at opposite sides of the guideway so that the safety device will not be dislodged, deflected or broken by strains due to pressure or blows of the king pin thereon, which are apt to occur in the operation of the vehicles.

Further objects and advantages of the invention will appear from the following specification of the preferred embodiment of the invention, shown in the accompanying drawings, and the novel features of the invention are set forth in the appended claims.

In said drawings:

Fig. 3 is a longitudinal, sectional elevation, enlarged, on line 3—3 of Fig. 2.

Fig. 4 is an enlarged, sectional plan view on line 4—4, Fig. 3, showing by full and broken lines different positions of the auxiliary coupling or safety device.

Figure 2:
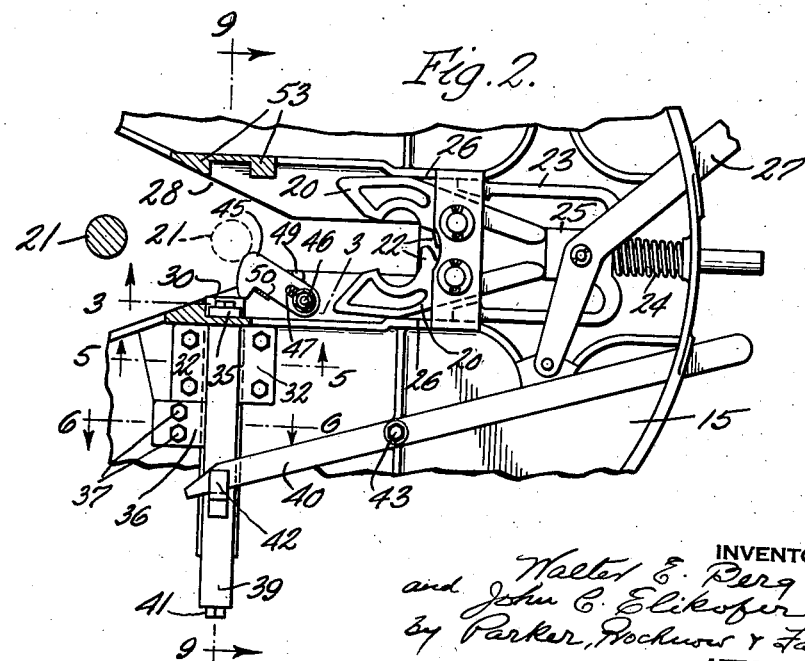
Fig. 2 is a fragmentary, inverted plan view, partly in section, of the same parts, showing the uncoupled or released position of the parts.

Figs. 5 and 6 are longitudinal, sectional elevations, enlarged, on lines 5—5 and 6—6 respectively, Fig. 2.

Figure 1:
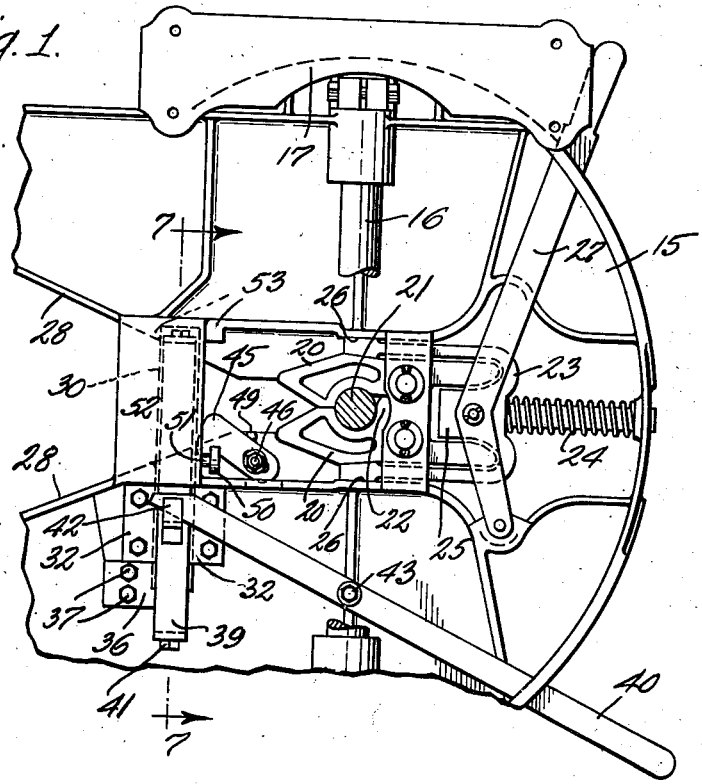
Fig. 1 is a fragmentary, inverted or upside-down, sectional plan view of one fifth wheel element and associated parts of a coupling device having auxiliary or safety means embodying the invention, showing the parts in coupled position.

Fig. 7 is an enlarged, transverse, sectional elevation on line 7—7, Fig. 1.

Fig. 8 is a transverse, sectional elevation on line 8—8, Fig. 4.

Fig. 9 is a transverse, sectional elevation, enlarged, on line 9—9, Fig. 2.

Fig. 10 is a plan view showing a modified construction of the trigger or detent for holding the safety bolt in its retracted position.

Figs. 11 and 12 are transverse, sectional views thereof on lines 11—11 and 12—12 respectively, Fig. 10.

The main or primary coupling device, illustrated in the drawings, is of a known construction, similar to that disclosed in Patent No. 1,999,375, granted April 30, 1935 to C. G. Seyferth et al. 15 represents the fifth wheel element or plate, which is mounted on one of the vehicles, usually the tractor. This element, as usual, is pivotally mounted to have a limited up and down tilting movement, as on a horizontal cross shaft 16, suitably secured at its opposite ends in supporting brackets which are stationarily fixed on the tractor. One of these brackets is shown at 17. The fifth wheel element is thus adapted to tilt or swing in a vertical plane so as to normally occupy a downwardly and rearwardly inclined position to facilitate its movement beneath the complementary element on the trailer in coupling the vehicles and allow the element 15 to then swing up to a horizontal position in face to face bearing contact with the downwardly facing trailer element.

Coupling jaws or members 20, 20 are pivotally mounted on the element 15 to swing horizontally toward and from each other and have substantially semi-circular recesses in their inner faces, in which the king pin 21, which is carried by the fifth wheel element on the trailer, is adapted to be received, so that when the jaws are closed together, they will hold the king pin in connection with the tractor element while permitting relative turning movement of the vehicles. In the normal position of the parts, before the vehicles are coupled together, the jaws are open or separated, as indicated in Fig. 2, and when the tractor is backed into position with its element 15 beneath the complementary trailer element, the king pin 21 will enter between the jaws 20, and, striking inwardly projecting lugs 22 on the coupling jaws 20, will close the jaws together about the king pin. When the jaws are thus closed, a yoke 23 slidably mounted on the element 15, will be automatically projected rearwardly by its spring 24, so as to place a central projecting portion 25 of the yoke between the front extensions of the jaws 20 and place the ends of the two legs of the yoke between the jaws 20 and longitudinal extending abutment faces 26 on the element 15, for holding the jaws in coupling engagement with the king pin. The yoke is retracted for releasing the jaws to uncouple the vehicles by a hand-actuated lever 27 which is fulcrumed on the element 15 and pivotally connected to the yoke for retracting it. When the vehicles are uncoupled, the projection 25 of the yoke is pressed by its spring 24 against the extensions of the jaws 20 and thus releasably retains the jaws open ready for the next coupling operation. 28 indicates a tapered slot or guideway in the element 15 for guiding the king pin to the coupling jaws when backing the tractor into coupling relation to the trailer.

The construction and operation of this main or primary coupling device is fully disclosed or described in the above mentioned patent, and the above brief description of the same is adequate for a clear understanding of the present improvement.

30 represents the safety bolt or member which is mounted on the fifth wheel element 15 at one side of the guideway 28 and in rear of the coupling members 20, to move transversely of the element 15 to a position in which it crosses the guideway 28 in rear of the king pin, when the vehicles are coupled together. Preferably this member 30 is in the form of a bar of rectangular cross section arranged to slide in a suitable guide 31 which is located on the element 15 at one side of the king pin guideway 28, and is provided with retaining plates 32 secured to the element 15 at opposite sides of the safety member 30 to slidably retain the latter in place in its guide. A rod 33 is rigidly connected at one end to the free end of the bar 30, as by a screw 34 securing the rod 33 to a lug 35 projecting out from the slide bar 30. The rod 33 is parallel with the slide bar 30 and passes through and is slidable endwise in a bearing 36 rigidly secured, as by bolts 37 to the element 15 at one side of the slide bar. A coil spring 38 encircles the rod 33 between the bearing 36 and the lug 35 on the slide bar. This spring tends to project the safety member 30 to the position shown in Fig. 1, in which it extends across the king pin guideway 28 in the element 15.

For retracting the safety member 30 against the action of the spring 38, a yoke or U-shaped bar 39, which straddles the bearing 36, is secured at its ends to the opposite ends of the rod 33 and is operatively engaged with an operating lever 40 for the safety member. One angular end of the yoke may be secured between the adjacent end of the rod 33, and the lug 35 on the slide bar 30, and the other angular end of the yoke may be secured by a screw 41, to the adjacent end of the rod 33, and the yoke is provided between its ends with an angular lug or part 42 having one end extending parallel with and spaced from the adjacent part of the yoke. One end of the hand-actuated operating lever 40 engages the lug 42 between the yoke and the spaced parallel portion of the lug, so that by swinging this lever, which is suitably fulcrumed at 43 on the element 15, the safety member 30 can be retracted to its normal position, shown in Fig. 2.

The safety member is releasably retained in its normal retracted position, shown in Figs. 2 and 9, by a trigger or detent 45, which is adapted to be engaged and tripped to release the safety member by the king pin 21 when coupling the vehicles together. This trigger or detent 45 may be of different constructions. As shown in Figs. 1–9, it consists of a hook-shaped piece provided with a longitudinal slot 47 through which passes a pivot stud 46 fixed to the element 15 and having a nut screwed on its outer end for retaining the trigger on the stud. The trigger is thus adapted to swing about the pivot as a center and also to move longitudinally forwardly and rearwardly by reason of the play allowed by the elongated pivot slot 47. A spring 48 confined in a longitudinal socket in the trigger bears at one end against the pivot stud 46, tending to urge the trigger rearwardly on the element 15. In its normal position, the trigger is held against a fixed stop 49 on the element 15 with its rear end projecting out into the king pin guideway 28 by a spring 50 which, as shown, consists of a spring strip fixed at one end to a stud 51 projecting from a part 52 of the element 15 which bridges the king pin guideway 28 beneath the safety member 30, with the free end of the spring engaging the outer side of the trigger.

When the vehicles are uncoupled, or in the normal position of the parts, the trigger 45 is pressed rearwardly by its spring 48 and held against the stop 49 by the spring 50 with the hooked end of the trigger engaging the free end of the safety member 30, and it holds the latter in its retracted position, as shown in Figs. 1 and 9. Then, when the tractor is backed toward the trailer for coupling it thereto, the rear end of the trigger engages the king pin 21 and the latter moves the trigger forwardly on its pivot 46 to the position shown by full lines in Fig. 4, to disengage its hooked end from the end of the slide bolt, and in the further rearward movement of the tractor, the king pin cams the trigger sidewise to the position shown by broken lines in Fig. 4, thus permitting the king pin to pass the trigger. When the safety member is thus released by the trigger, it is projected out by its spring 38 against the side of the king pin and when, in its continued movement, the king pin clears the end of the safety member, the latter will be projected to the position across the guideway 28, as shown in Fig. 1, in rear of the king pin, so as to prevent the withdrawal of the king pin from the guideway, and thus prevent disconnection or separation of the tractor from the trailer. After the king pin passes the safety member, it is free to continue its movement for engagement with the coupling jaws 20 to couple the vehicles together in the usual manner.

The auxiliary or safety member will remain in its projected position until retracted by actuation of its operating lever 40, and in the event of the breakage or failure, for any reason, of the coupling device, the safety member will be in its position across the guideway so as to obstruct the same and prevent the withdrawal of the king pin therefrom, and thus prevent accidental separation of the tractor and trailer, notwithstanding that the king pin may have become disengaged from the primary coupling device. In order to disconnect the vehicles, the coupling device is actuated to release the king pin, as before explained, and the lever 40 is actuated to retract the safety member 30. The trigger will then be shifted rearwardly to the Fig. 2 position by its spring 48 and will hold the safety device retracted to permit the king pin to pass out of the guideway 28. In passing out, the king pin will push the trigger over to the side of the guideway 28 and pass by the trigger, the latter pressing the safety member back in its guide, and when the king pin clears the trigger, the safety member and the trigger will be returned to their normal positions, shown in Fig. 2, by the springs 38 and 50, and the device will be ready for the next coupling operation of the vehicles.

The fifth wheel element 15 is provided at the opposite side of the king pin guideway 28 from that at which the safety member is mounted, with a keeper or abutment 53 which the safety member engages when projected and which cooperates with the guides for the safety member at the other side of the guideway to rigidly hold the safety member against displacement or deflection when in its projected operative position. This abutment or keeper, as shown, consists of a socket in the side wall of the king pin guideway into which the end of the safety member is projected and held by the operating spring 38 for the latter. The safety member is thus held rigidly at both ends or at opposite sides of the king pin guideway and so forms a very strong and rigid obstruction across the guideway for engagement of the king pin, and the device cannot be dislodged or deflected even if subjected to severe strains by blows or pressure of the king pin thereon. It thus forms a very reliable insurance against disconnection or separation of the vehicles in the event of failure, from any cause, of the main or primary coupling device.

A trigger of another construction, suitable for use in place of the described trigger 45, is shown in Figs. 10–12. This trigger comprises a section 45a which is pivoted on the stud 46 and a second section 45b which is slidable longitudinally in a cavity in the first section. A spring 45c confined in a longitudinal slot in the section 45b and bearing at opposite ends against the end of the slot and against a screw 45d secured to the first section and passing through the spring slot, urges the sliding section outwardly. When this trigger is used the sliding section is adapted to be pushed inwardly in the other section by engagement with the king pin 21 to disengage it from the end of the safety member 30 to permit the latter to be projected by its spring 38 to its operative obstructing position in rear of the king pin. Otherwise this trigger functions in the same manner as the trigger 45, first described.

While our improved safety means have been herein disclosed in connection with main coupling means of a particular construction, in order to give a clear understanding of the invention, it will be understood that our improvements are not restricted in application thereto, but are also applicable to coupling means of other constructions.

We claim as our invention:

1. In a fifth wheel coupling device for vehicles, comprising primary coupling members on the two vehicles which cooperate to automatically couple the vehicles together by movement of one vehicle into coupling relationship with the other, an auxiliary coupling member mounted on one vehicle to move laterally in a generally horizontal direction transverse to the direction of said coupling movement of the vehicle, to and from a position to obstruct the uncoupling movement of the primary coupling member on the other vehicle which is necessary to disconnect the vehicles, spring means which automatically shift said auxiliary coupling member into and retain it releasably in said obstructing position upon the coupling together of the vehicles, manual means for retracting said member from said obstructing position, and a spring actuated pivoted trigger which normally holds said auxiliary coupling member out of such obstructing position and which is moved to release said member by the movement of one vehicle into coupling relation to the other vehicle.

2. In a fifth wheel coupling device for vehicles, comprising primary coupling members on the two vehicles which cooperate to automatically couple the vehicles together by movement of one vehicle into coupling relationship with the other, an auxiliary coupling member slidably mounted on one vehicle to move in a generally horizontal direction transverse to the direction of said coupling movement of the vehicle to and from a position to obstruct the uncoupling movement of the primary coupling member on the other vehicle which is necessary to disconnect the vehicles, spring means which automatically shift said auxiliary coupling member into and retain it releasably in said obstructing position upon the coupling together of the vehicles, and a spring actuated pivoted trigger which normally holds said auxiliary coupling member out of such obstructing position and is positioned to be tripped by the primary coupling member on the other vehicle to release said auxiliary coupling member when one vehicle is moved into coupling relation to the other vehicle.

3. In a fifth wheel coupling device for vehicles, comprising a king pin on one vehicle and coupling means on the other vehicle which cooperate with the king pin to couple the vehicles together, safety coupling means complemental to the aforesaid coupling means comprising a spring-actuated sliding member on said other vehicle which is automatically projected by its spring into and retained releasably in a position back of said king pin and in the horizontal plane of said coupling means to prevent disconnection of the vehicles in the event of failure of said coupling device, and a spring-actuated trigger which normally holds said sliding member out of the path of movement of the king pin against the action of its spring to allow the vehicles to be coupled together, said trigger being positioned to be tripped by the king pin to release said sliding member when one vehicle is moved into coupling relation to the other vehicle.

4. In a fifth wheel coupling device for vehicles, comprising a king pin on one vehicle, a fifth wheel element on the other vehicle having a slot in which said king pin is guided, and coupling means on said element which cooperate with the king pin to couple the vehicles together, a slide bolt on said element, means which automatically projects said bolt to and retains it releasably in a position back of and in the path of movement of the king pin to prevent disconnection of the vehicles in the event of failure of said coupling device, a guide for said bolt on said element at one side of said slot, a stationary keeper on said element at the opposite side of said slot with which the said bolt engages when said slot is projected, manual means for retracting said bolt to release the king pin, and a trigger which normally holds said bolt retracted to allow of the coupling of the vehicles, and which is tripped by the king pin to release said bolt when coupling the vehicles together.

5. In a fifth wheel coupling device for vehicles, comprising a king pin on one vehicle, a fifth wheel element on the other vehicle having a slot in which said king pin is guided, and coupling means on said element which cooperate with the king pin to couple the vehicles together, a slide bolt on said element, a spring for projecting said bolt and releasably holding it back of and in the path of movement of the king pin to prevent disconnection of the vehicles in the event of failure of said coupling device, a guide for said bolt on said element at one side of said slot, a stationary keeper on said element at the opposite side of said slot with which the said bolt engages when projected by its spring, and a spring-actuated trigger which normally holds said bolt retracted against the action of its spring to allow of the coupling of the vehicles, and which is tripped by the king pin to release said bolt when coupling the vehicle together.

6. In a fifth wheel coupling device for vehicles, comprising primary coupling members on the two vehicles which cooperate to automatically couple the vehicles together by movement of one vehicle into coupling relationship with the other, an auxiliary coupling member slidably mounted on one vehicle to move to and from a position to obstruct the uncoupling movement of the primary coupling member on the other vehicle which is necessary to disconnect the vehicles, said auxiliary member including a rod which is slidably guided in a bearing, a yoke straddling said bearing and attached at its ends to said rod, a spring surrounding said rod between said bearing and a part fixed to said rod for shifting said auxiliary member into said obstructing position upon the coupling together of the vehicles, a spring actuated trigger which normally holds said auxiliary member out of such obstructing position and is positioned to be tripped by the primary coupling member on the other vehicle, to release said auxiliary member when one vehicle is moved into coupling relation to the other vehicle, and a lever connected with said yoke for retracting said auxiliary member.

7. In a fifth wheel coupling device for vehicles, comprising primary coupling members on the two vehicles which cooperate to automatically couple the vehicles together by movement of one vehicle into coupling relationship with the other, an auxiliary coupling member slidably mounted on one vehicle to move to and from a position to obstruct the uncoupling movement of the primary coupling member on the other vehicle which is necessary to disconnect the vehicles, said auxiliary member comprising a bar slidable in a guide, a rod fixed to said bar parallel therewith and guided in a bearing, a yoke straddling said bearing and attached at its ends to said rod, a spring surrounding said rod between said bearing and a part fixed to said rod for shifting said auxiliary member into said obstructing position upon the coupling together of the vehicles, a spring actuated trigger which normally holds said auxiliary member out of such obstructing position and is positioned to be tripped by the primary coupling member on the other vehicle, to release said auxiliary member when one vehicle is moved into coupling relation to the other vehicle, and a lever connected with said yoke for retracting said auxiliary member.

8. In a fifth wheel coupling device for vehicles, comprising primary coupling members on the two vehicles which cooperate to automatically couple the vehicles together by movement of one vehicle into coupling relationship with the other, means supplementing and cooperating with said primary coupling device, comprising a supplemental coupling member mounted on one vehicle to move substantially horizontally transverse to the direction of said coupling movement of the vehicle to a position in which it obstructs the uncoupling movement of the primary coupling member on the other vehicle that is necessary to disconnect the vehicles, automatically acting means released by movement of one vehicle into coupling relation to the other vehicle which positively shifts said supplemental member into and releasably retains it in said obstructing position, an automatic trigger which normally holds said supplemental coupling member out of such obstructing position to allow the coupling together of the vehicles by said primary device, and which is actuated to release said supplemental member by the coupling movement of one vehicle relatively to the other, and means for retracting said member from said obstructing position.

WALTER E. BERG.
JOHN C. ELIKOFER.